United States Patent
Hirabayashi (10) Patent No.: US 11,303,082 B2
(45) Date of Patent: Apr. 12, 2022

(54) DC MOTOR

(71) Applicant: DENSO CORPORATION, Kariya (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 16/836,318

(22) Filed: Mar. 31, 2020

(65) Prior Publication Data

US 2020/0313376 A1 Oct. 1, 2020

(30) Foreign Application Priority Data

Apr. 1, 2019 (JP) .............................. JP2019-070200

(51) Int. Cl.
| | |
|---|---|
| *H01R 39/04* | (2006.01) |
| *H01R 39/02* | (2006.01) |
| *H01R 39/22* | (2006.01) |
| *C22C 32/00* | (2006.01) |
| *H02K 13/10* | (2006.01) |
| *C04B 35/52* | (2006.01) |
| *H01R 39/26* | (2006.01) |

(52) U.S. Cl.
CPC ......... *H01R 39/025* (2013.01); *C04B 35/522* (2013.01); *C22C 32/0047* (2013.01); *H01R 39/04* (2013.01); *H01R 39/22* (2013.01); *H01R 39/26* (2013.01); *H02K 13/105* (2013.01)

(58) Field of Classification Search
CPC .......... H01R 39/04; H01R 39/18; H01R 3/26; H01R 39/20; H01R 39/025; H01R 39/022; H01R 39/027
See application file for complete search history.

(56) References Cited

U.S. PATENT DOCUMENTS

| | | | |
|---|---|---|---|
| 2017/0047697 A1* | 2/2017 | Kagawa | ................. H01R 39/20 |
| 2019/0305652 A1* | 10/2019 | Hirabayashi | ......... H02K 13/105 |
| 2019/0393662 A1* | 12/2019 | Hirabayashi | ........... H01R 39/26 |

FOREIGN PATENT DOCUMENTS

| | | |
|---|---|---|
| EP | 0606970 A1 | 7/1994 |
| GB | 2063577 A | 6/1981 |
| JP | S59-185138 A | 10/1984 |
| JP | 2007-082367 A | 3/2007 |
| WO | 2008/040684 A1 | 4/2008 |

* cited by examiner

*Primary Examiner* — Dang D Le
(74) *Attorney, Agent, or Firm* — Oliff PLC

(57) ABSTRACT

A DC motor is provided that can suppress a commutator from wearing. A DC motor including a commutator formed of copper or a copper alloy of 99% or more copper, and a brush pressed against and in contact with the commutator, wherein the brush is composed of a sintered compact including graphite and copper powder, hard compound particles higher in hardness than any of the copper or the copper alloy and the graphite or the copper powder are contained in at least one of the commutator and the brush and are scattered on or near a contact surface of the commutator with the brush at least during use.

12 Claims, 5 Drawing Sheets

DC MOTOR

CROSS REFERENCE TO RELATED APPLICATION

This application is based on and claims the benefit of priority from earlier Japanese Patent Application No. 2019-070200, filed on Apr. 1, 2019, the description of which is incorporated herein by reference.

TECHNICAL FIELD

The present disclosure relates to a DC motor.

BACKGROUND

In general, in a DC motor, a brush is held pressed against a commutator to establish electric contact between the commutator and the brush. In this case, rotation of the commutator wears the brush away. For extended life of the DC motor, various methods have recently been suggested to prevent wear of the brush. On the other hand, for extended life of the DC motor, there has been a desire to also prevent wear of the commutator. For prevention of wear of the commutator, a technique has been known in which a hard coating layer mainly containing a nitride or a carbide of Ti, Ta, or the like and having a thickness of 1 µm to 2 µm is formed on a surface of the commutator by sputtering or ion plating (for example, JP 1984-185138 A).

SUMMARY

An aspect of the present disclosure includes a commutator formed of copper or a copper alloy of 99% or more copper and a brush pressed against and in contact with the commutator.

The brush includes a sintered compact including graphite and copper powder. Hard compound particles higher in hardness than any of the copper or the copper alloy and the graphite or the copper powder are contained in at least one of the commutator and the brush contains and are scattered on or near a contact surface of the commutator and the brush at least during use.

DETAILED DESCRIPTION OF THE PREFERRED EMBODIMENTS

In JP 1984-185138 A, only 1 µm to 2 µm of hard coating layer is formed on the surface of the commutator. Thus, the commutator is poor in durability and cannot maintain the hard coating layer for an extended period of time. In other words, the commutator may wear away to a wear limit. Additionally, sputtering and ion plating are low in productivity and involve high material costs, leading to high production costs.

In view of these problems, a main object of the present disclosure is to provide a DC motor that can suppress the commutator from wearing.

A first aspect of the present disclosure includes a commutator formed of copper or a copper alloy of 99% or more copper and a brush pressed against and in contact with the commutator. The brush includes a sintered compact including graphite and copper powder. Hard compound particles higher in hardness than any of the copper or the copper alloy and the graphite or the copper powder are contained in at least one of the commutator and the brush contains and are scattered on or near a contact surface of the commutator and the brush at least during use.

At least one of the commutator and the brush contains the hard compound particles. The hard compound particles are scattered on or near the contact surface of the commutator and the brush at least during use, and thus hard portions including the hard compound particles and non-hard portions different from the hard portions are present on the contact surface of the commutator and the brush. The hard portions can suppress the non-hard portions from wearing, in other words, prevent wearing of the copper or copper alloy portions of the commutator. This enables wearing of the commutator to be suppressed, allowing improvement of life of the commutator. Note that "during use" refers at least to a state in which the commutator is used by a user and which follows the start of use.

In a second aspect of the present disclosure, the hard compound particles are contained in the brush.

In a case where the hard compound particles are contained in the brush, sliding between the brush and the commutator causes the hard compound particles to be transferred to the commutator. As a result, the hard compound particles are scattered on or near the contact surface of the commutator and the brush. Additionally, as the brush wears away, the hard compound particles contained in the brush continue to be transferred. Thus, even in a case where the hard compound particles are lost from the contact surface of the commutator and the brush, new hard compound particles are fed to allow the hard compound particles to be continuously scattered on or near the contact surface of the commutator and the brush.

In a third aspect of the present disclosure, the hard compound particles are contained in the brush within a predetermined assumed wear range from the contact surface with the commutator.

The hard compound particles are contained in the brush within the predetermined assumed wear range from the contact surface with the commutator. In other words, the hard compound particles are contained within the range in which the brush wears away. Thus, the hard compound particles can be fed to the contact surface of the commutator and the brush until the assumed wear range of the brush wears away and the brush reaches the end of life of the brush. The hard compound particles can be kept scattered on or near the contact surface of the commutator and the brush, allowing the commutator to be suppressed from wearing.

In a fourth aspect of the present disclosure, in the brush, an area ratio of the hard compound in a plane orthogonal to a direction in which the brush is pressed against the commutator is 0.4% to 5%.

Not all the hard compound particles in the brush are transferred, and some of the hard compound particles are lost instead of being transferred. Thus, the hard compound particles with a certain area ratio need to be contained. On the other hand, undesirably, the hard compound particles with an excessively high area ratio reduce the ratio of the graphite, hindering action of a lubrication function of the graphite. Thus, in a case where, in the brush, an area ratio of the hard compound in a plane orthogonal to a direction in which the brush is pressed against the commutator is 0.4% to 5%, lubricity can be retained with the hard compound particles appropriately transferred to the contact surface of the commutator and the brush. In a fifth aspect of the present disclosure, an amount of the hard compound particles contained in the sintered compact is 1 mass % or less.

An increased amount of hard compound particles contained in the sintered compact (brush) scrapes the commutator or reduces the amount of graphite contained in the sintered compact and hinders action of the lubrication function of the graphite. Thus, limiting the amount of the hard compound particles contained in the sintered compact to 1 mass % or less allows inhibition of scraping of the commutator by the hard compound and suppression of degradation of lubrication between the commutator and the brush.

In a sixth aspect of the present disclosure, a metal sulfide solid lubricant is contained in the brush.

Sliding between the commutator and the brush causes the graphite in the brush to be transferred to the commutator, with a graphite film formed on the contact surface of the commutator and the brush. At this time, in a case where the metal sulfide solid lubricant is contained in the brush, the metal sulfide solid lubricant is also contained in the graphite film formed on the contact surface of the commutator and the brush. The graphite film in which the metal sulfide solid lubricant is contained provides excellent lubricity. Thus, in addition to suppression of wear due to the hard compound particles, the lubricity provided by the metal sulfide solid lubricant protects the contact surface of the commutator and the brush.

In a seventh aspect of the present disclosure, the hard compound particles are scattered on or near the contact surface of the commutator and the brush.

In the commutator, the hard compound particles having a relatively high hardness are scattered on or near the contact surface of the commutator and the brush. In the commutator, the hard compound particles have been scattered on or near the contact surface of the commutator and the brush from before use, enabling reduction of wear of the commutator. Additionally, pre-scattering of the hard compound particles in the commutator instead of transfer from the brush facilitates control of the ratio in which the hard compound particles are scattered in the commutator.

In an eighth aspect of the present disclosure, an abundance ratio of the hard compound particles present on or near the contact surface of the commutator is a ratio at which an average of 10 to 100 hard compound particles are present within an area of 100 $\mu m \times 100$ $\mu m$ of the contact surface of the commutator and the brush.

As a result of repeated experiments with the abundance ratio of the hard compound particles changed, the present inventor found that 10 or more hard compound particles present within the area of 100 $\mu m \times 100$ $\mu m$ improve a wear reduction effect on the commutator. The present inventor also found that more than 100 hard compound particles excessively enhance the action of scraping the brush. Thus, in the present configuration, 10 to 100 hard compound particles are present within the area of 100 $\mu m \times 100$ $\mu m$ of the contact surface of the commutator and the brush. This allows the brush to be suppressed from scraping while reducing wear of the commutator.

In a ninth aspect of the present disclosure, a ratio, to a surface area of the commutator, of an exposed area of the hard compound particles exposed from the contact surface of the commutator is 0.4% or more.

As a result of repeated experiments with the ratio of the exposed area of the hard compound particles to the surface area of the commutator changed, the present inventor found that the wear reduction effect on the commutator is enhanced by the exposed hard compound particles accounting for 0.4% or more of the surface area of the commutator. Thus, in the present configuration, the exposed hard compound particles account for 0.4% or more of the surface area of the commutator. This enables reduction in wear of the commutator.

In a tenth aspect of the present disclosure, the hard compound particles are each 1 to 6 $\mu m$ in size.

Sliding between the commutator and the brush causes the graphite in the brush to be transferred to the commutator, with a graphite film formed on the contact surface of the commutator and the brush. The graphite film generally has an average thickness of approximately 1 $\mu m$. Thus, excessively small hard compound particles are buried in the graphite film.

On the other hand, in a case where the hard compound particles are excessively large in size, during sliding between the hard compound particles and the brush, the hard compound particles offer sliding resistance against the brush and are likely to detach from the contact surface of the commutator and the brush. Additionally, the sliding resistance causes the brush to be excessively scraped off.

Thus, the hard compound particles are each 1 to 6 $\mu m$ in size. The hard compound particles each of more than 1 $\mu m$ in size are likely to be exposed from the graphite film. Additionally, the hard compound particles each of less than 6 $\mu m$ in size can be prevented from increasing the sliding resistance. This allows the brush and the commutator to be appropriately supported, enabling reduction in wear of the commutator.

In an eleventh aspect of the present disclosure, the hard compound particles have a resistivity of 16 $\mu\Omega m$ or less.

Electric contact resistance between the brush and the commutator significantly depends on contact resistance of the graphite film formed on the contact surface of the commutator and the brush. The contact resistance of the graphite film depends on the resistivity of carbon, corresponding to a main component, and carbon has a resistivity of approximately 16 $\mu\Omega m$. Thus, in a case where the resistivity of the hard compound particles is equal to or lower than the resistivity of carbon, in other words, equal to or lower than 16 $\mu\Omega m$, the contact resistance between the brush and the commutator is prevented from increasing in spite of the scattered hard compound particles. Using the hard compound particles with a resistivity of 16 $\mu\Omega m$ or less allows wear of the commutator to be suppressed, while inhibiting increase in resistance of the motor.

In a twelfth aspect of the present disclosure, an outer peripheral surface of the commutator has an uneven shape parallel to a direction of sliding over the brush.

In the related art, an uneven shape parallel to the direction of sliding over the brush is provided on the outer peripheral surface of the commutator to stabilize a sliding contact state of the brush. However, for a common commutator and a common brush, repeated sliding gradually wears the uneven shape away and also reduces a stabilization effect on the contact state.

Thus, the hard compound particles are scattered on or near the contact surface of the commutator and the brush to suppress the commutator from wearing and to retain the uneven shape of the outer peripheral surface of the commutator. This allows sliding contact with the brush to be kept stabilized for an extended period of time.

A configuration embodied as a starter starting an engine of a vehicle will be described based on the drawings. The starter according to the present embodiment is assumed to be used in a vehicle equipped with an idling stop system.

Figure 1:
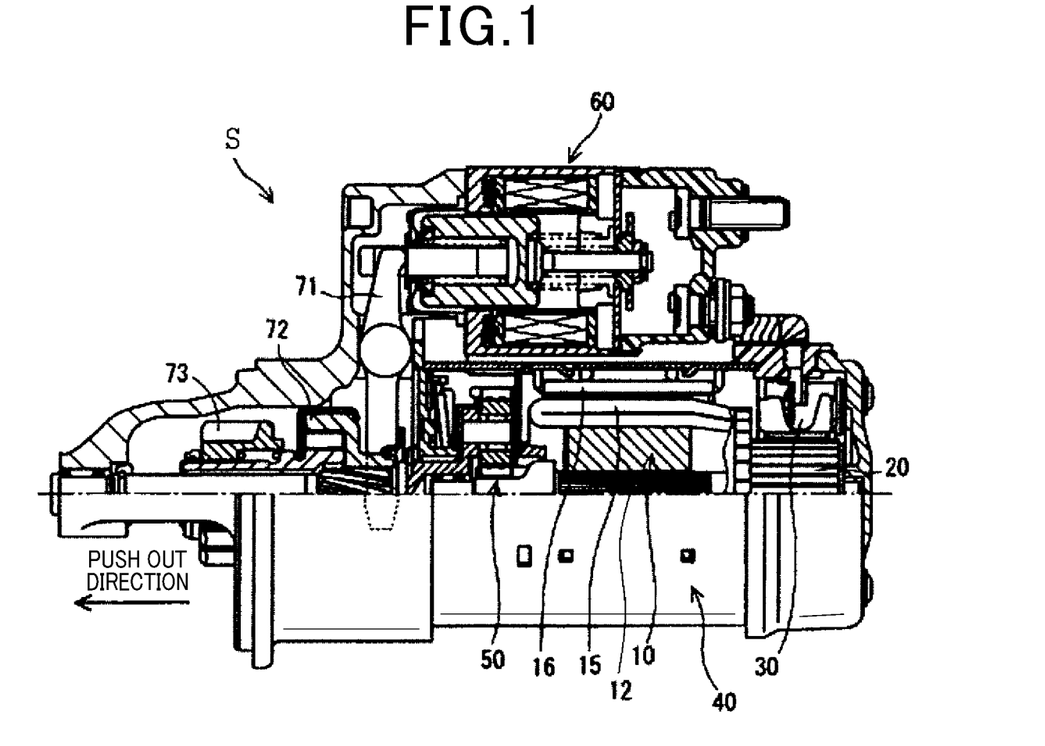
FIG. 1 is a partially cutaway cross-sectional view of a starter.

FIG. 1 is a schematic configuration diagram of a starter S. The starter S includes a DC motor 40, a speed reduction unit 50 reducing rotation of the DC motor 40 and transmitting the reduced rotation to a pinion gear 73, and a magnet switch 60 used as a switch for supplying power to the DC motor 40. The speed reduction unit 50 includes, for example, a planetary gear mechanism.

The magnet switch 60 corresponds to a switch for causing the starter S to rotate a ring gear of the engine. For example, in a case where a user operates a key to turn on an IG switch, the magnet switch 60 causes a shift lever 71 to push out the pinion gear 73 opposite to the DC motor 40, with the ring gear of the engine meshed with the pinion gear 73. The DC motor 40 is electrically connected via the magnet switch 60 to transmit the rotation of the DC motor 40 to the pinion gear 73 via the speed reduction unit 50 and a one-way clutch 72.

The DC motor 40 includes a rotor 10 corresponding to an armature, and the rotor 10 includes a rotation shaft 12 provided in the center of the rotor 10 and a coil 15 provided around the rotation shaft 12. The rotation shaft 12 is provided with a commutator 20 connected to coils 15. A field system for the DC motor 40 is of a magnet field type, and a magnet 16 for magnetic fields is fixed to an inner peripheral surface of a yoke. The coils 15 of the rotor 10 are disposed inside the magnet 16.

Figure 2:
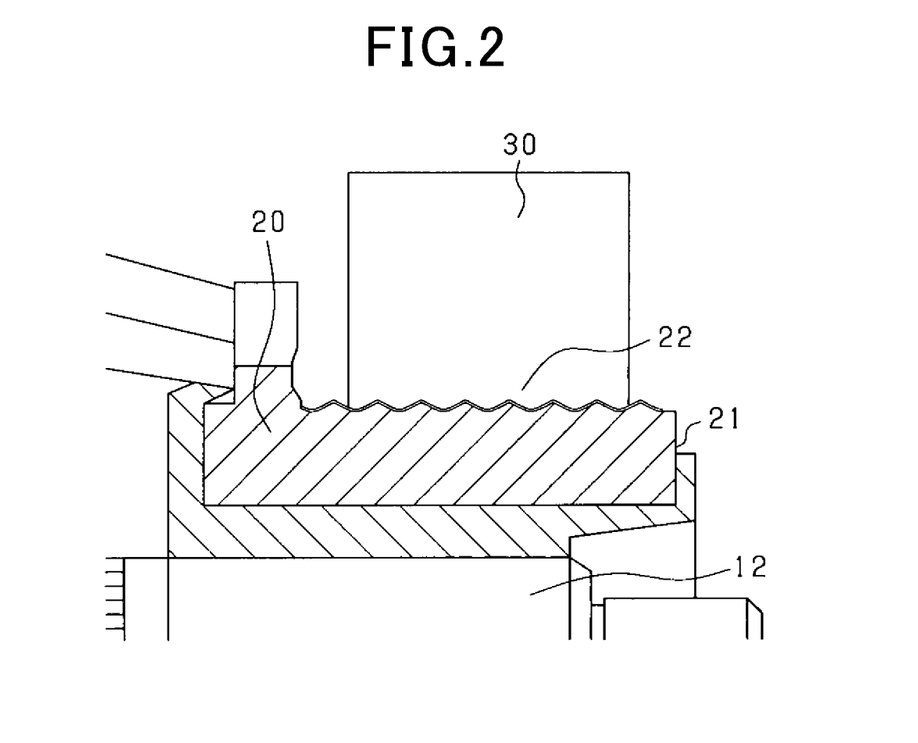
FIG. 2 is a partially enlarged cross-sectional view of a commutator.

The commutator 20 will be described using FIG. 1 and FIG. 2. FIG. 2 is a partially enlarged cross-sectional view of the commutator 20. The commutator 20 includes a plurality of segments 21 provided at regular intervals in a circumferential direction, and each of the segments 21 is connected to a corresponding one of the coils 15. The commutator 20 is formed of copper or a copper alloy of 99% or more copper. More specifically, the commutator 20 is formed of silver-containing copper or phosphorous deoxidized copper. Note that it is sufficient that an exposed outer peripheral surface of the commutator 20 and portions of the commutator 20 related to electric connection, in other words, the segments 21, are formed of copper or a copper alloy.

A brush 30 is pressed against and in sliding contact with the commutator 20. The outer peripheral surface of the commutator 20 is provided with a uneven portion 22 with an uneven shape. The uneven portion 22 is formed parallel to the direction of sliding over the brush 30, in other words, a rotating direction of the commutator 20, and has a shape alternately provided with circular arc-shaped recesses and sharp protrusions. Each of the grooves in the uneven portion 22 has a depth of, for example, approximately 0.1 mm to 0.3 mm, and the distance between the protrusions is approximately 1 mm. The uneven portion 22 forms, in the brush 30, grooves into which the uneven portion 22 is fitted. Fitting between the brush 30 and the commutator 20 enables a contact state of the brush 30 to be stabilized, allowing suppression of sparking.

Figure 3:
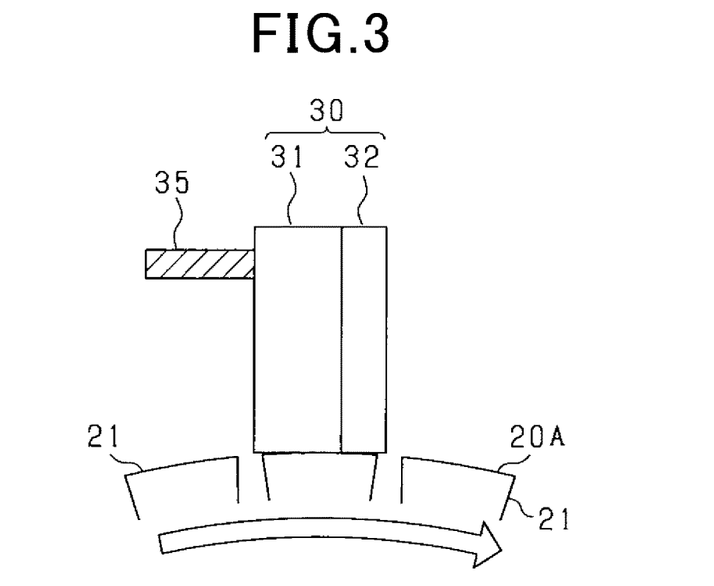
FIG. 3 is a schematic diagram illustrating sliding between a brush and the commutator.

A configuration of the brush 30 will be described using FIG. 3. FIG. 3 is a schematic diagram illustrating sliding between the brush 30 and the commutator 20. An arrow in FIG. 3 indicates the direction of sliding of the commutator 20 over the brush 30.

The brush 30 includes a sintered compact containing graphite, copper, and the like. The brush 30 includes a pigtail 35 implanted in a side surface of the brush 30 and connected to an external device. Note that, although not illustrated, the brush 30 is pressed against the commutator 20 by a spring provided opposite to the commutator 20.

The brush 30 is a multilayered brush including a first layer 31 and a second layer 32 arranged in the rotating direction of the commutator 20. During rotation of the commutator 20, the first layer 31 first comes into contact with each of the segments 21, and the second layer 32 subsequently comes into contact with the segment 21. In that case, the second layer 32 is the last to come into contact with each segment 21. The first layer 31 has a high copper content and a small resistance value, while the second layer 32 has a lower copper content and a larger resistance value than the first layer 31. The second layer 32 is thinner than the first layer 31. Specifically, the amount of copper powder (hereinafter referred to as the "copper amount") in the first layer 31 is 30 to 60 mass % of the sintered compact, while the copper amount of the second layer 32 is less than 30 mass % of the sintered compact.

Figure 4:
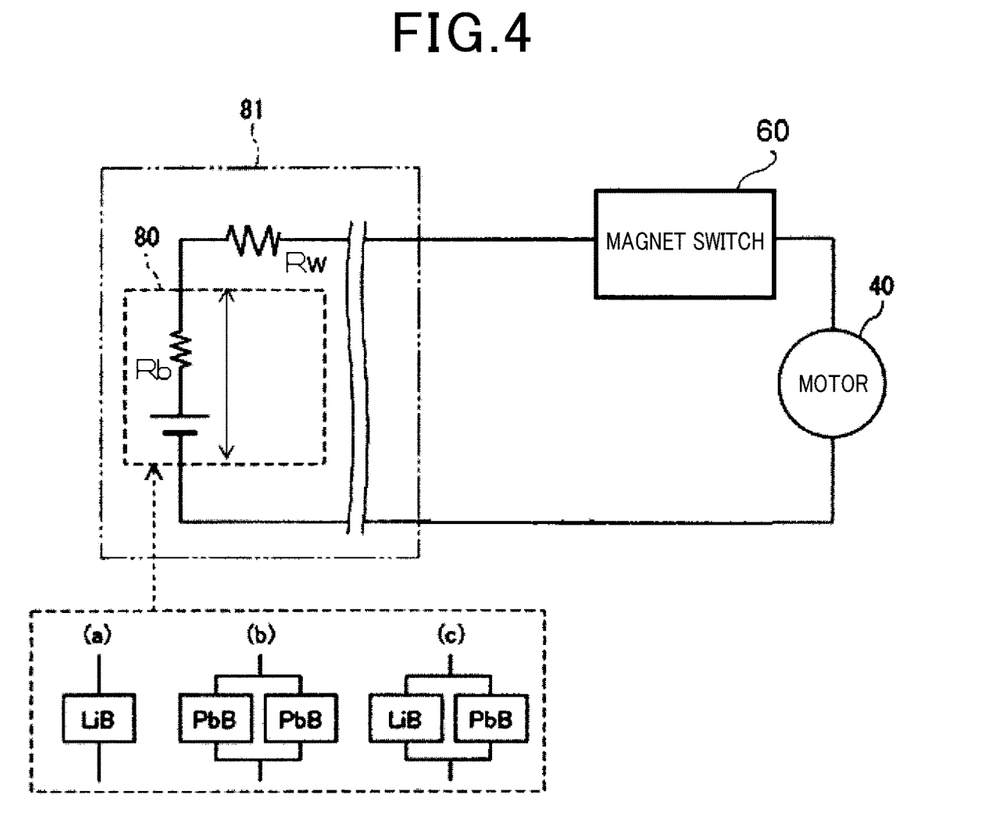
FIGS. 4(a), 4(b), and 4(c) are diagrams illustrating examples of a configuration of a starting circuit connected to a DC motor.

Now, a circuit for supplying power to the DC motor 40 will be described using FIG. 1 and FIG. 4. FIG. 4 is a diagram illustrating a configuration of a starting circuit 81 connected to the DC motor 40 via the magnet switch 60. The commutator 20 is supplied with power from a battery 80 via the brush 30, and supplies the coil 15 with the power supplied from the brush 30. The coil 15 is supplied with power to rotate the rotor 10. In the DC motor 40, the commutator 20 rotates, for example, at a peripheral speed of higher than 30 m/s during no-load operation. In the related art, one lead-acid battery is often used to supply power to the starter S. A starting circuit using one lead-acid battery typically has an open circuit voltage ranging from 11 V to 14 V and a circuit resistance of approximately 6 to 8 milliohms, the circuit resistance being obtained by adding together wiring resistance and the internal resistance of the battery.

On the other hand, in recent years, the battery 80 includes a lithium-ion battery or the like to reduce weight and to increase charging efficiency. For example, the battery 80 has a configuration with a lithium-ion battery (LiB) as illustrated in FIG. 4(a), a configuration with two lead-acid batteries (PbB) connected in parallel as illustrated in FIG. 4(b), or a configuration with a lithium-ion battery and a lead-acid battery connected in parallel as illustrated FIG. 4(c). These batteries 80 have an open circuit voltage ranging from 11 V to 14 V and a circuit resistance R of less than 5 milliohms, the circuit resistance being obtained by adding together wiring resistance Rw and the internal resistance Rb of the battery 80. Thus, the use of the batteries 80 increases a voltage applied to the DC motor 40 and also increases a rotation speed of the DC motor 40. The DC motor 40 according to the present embodiment has an applied voltage of approximately 12 V during cold starting and a current of 100 A or more flowing during activation of the DC motor 40.

In the DC motor 40 according to the present embodiment used in a circuit configuration as illustrated in FIG. 4, wear is likely to be caused by sparking. In general, sparking and wear between the commutator 20 and the brush 30 more often occur with a magnetic field system such as the DC motor 40 according to the present embodiment than with the winding field system. In the starting circuit 81 using a lithium-ion battery or the like, the DC motor 40 has an increased rotation speed, leading to more frequent sparking and wear between the commutator 20 and the brush 30.

More frequent sparking may cause the uneven portion 22 to be easily scraped off. In general, the sliding between the commutator 20 and the brush 30 gradually causes wear out on the uneven portion 22 and correspondingly gradually degrades the stabilization effect for the sliding contact of the brush 30. In particular, in a configuration involving thin grooves in the uneven portion 22 and a high likelihood of sparking as in the present embodiment, the uneven shape is worn out early, eliminating the stabilization effect for the sliding contact of the brush 30.

Figure 5:
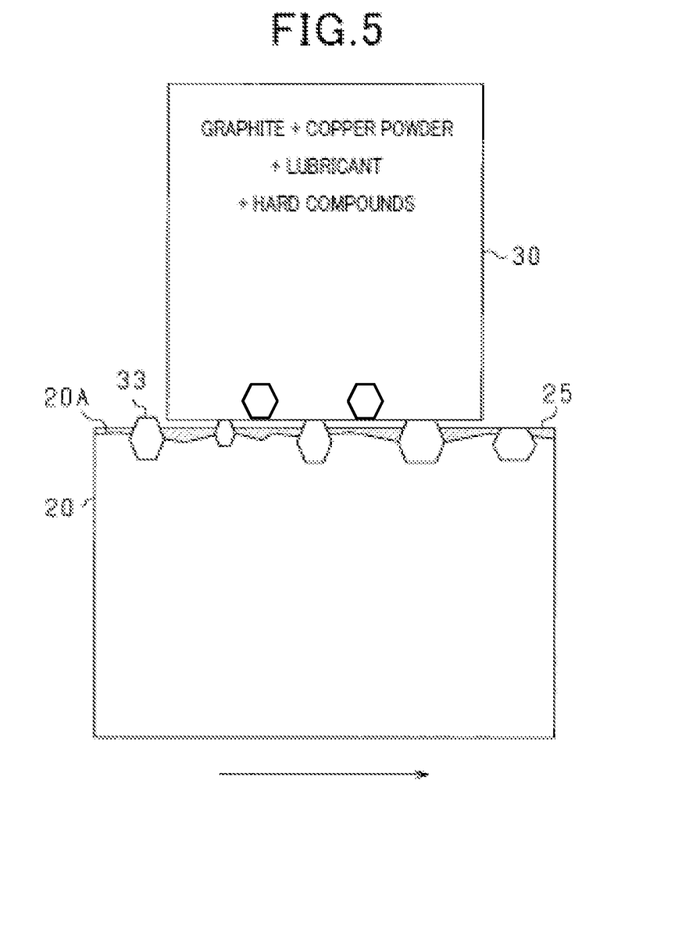
FIG. 5 is a schematic diagram of the commutator and the brush during use.

Thus, in the present embodiment, at least during use of the starter S after the use is started, hard compound particles 33 are scattered on or near a contact surface 20A of the commutator 20 with the brush 30 as illustrated in FIG. 5. FIG. 5 is a schematic diagram of the commutator 20 and the brush 30 during use. The hard compound particles 33 are contained in the brush 30, transferred by the sliding between the brush 30 and the commutator 20, and scattered on or near the contact surface 20A of the commutator 20. Note that "near" indicates a predetermined depth from the contact surface 20A of the commutator 20, for example, a depth of 20 μm from the contact surface 20A.

A graphite film 25 is formed on the contact surface 20A of the commutator 20 with the brush 30 by the sliding between the commutator 20 and the brush 30. The graphite film 25 is formed by transferring, to the contact surface 20A of the commutator 20, graphite contained in the brush 30. The graphite film 25 formed provides the contact surface 20A of the commutator 20 with lubricity. The graphite film 25 generally has an average thickness of approximately 1 μm.

A metal sulfide solid lubricant in addition to graphite and copper powder are also contained in the brush 30. The metal sulfide solid lubricant includes, for example, tungsten disulfide or molybdenum disulfide. In a case where the metal sulfide solid lubricant is contained in the brush 30, the metal sulfide solid lubricant is transferred simultaneously with transfer of the graphite, and the same metal sulfide solid lubricant as that contained in the brush 30 is contained in the graphite film 25. The graphite film 25 in which the metal sulfide solid lubricant is contained provides excellent lubricity. Note that it is sufficient that a metal sulfide solid lubricant is contained in at least one of the first layer 31 and second layer 32 of the brush 30. Alternatively, different metal sulfide solid lubricants may be contained in the first layer 31 and second layer 32 of the brush 30. For example, tungsten disulfide may be contained in the first layer 31, molybdenum disulfide may be contained in the second layer 32.

Furthermore, the hard compound particles 33 are contained in the brush 30. The hard compound particles 33 have a higher hardness than copper or a copper alloy corresponding to a base material of the commutator 20 and graphite, copper power, and the like contained in the brush 30. The hard compound particles 33 have a Vickers hardness of at least 5 GPa and desirably more than 10 GPa. The hard compound particles 33 are inorganic compounds of carbon (carbides) and are, for example, molybdenum carbide, tungsten carbide, boron carbide, or silicon carbide.

Desirably, the hard compound particles 33 are each 1 to 6 μm in size. More desirably, the hard compound particles 33 may each be 4.5 μm to 5 μm in size. The graphite film 25 has an average thickness of approximately 1 μm, and thus the hard compound particles 33 each of less than 1 μm in size are buried in the graphite film 25. When the hard compound particles 33 on the contact surface 20A of the commutator 20 slide over the brush 30, the hard compound particles 33 each of more than 6 μm and particularly more than 10 μm offer sliding resistance and are likely to fall from the contact surface 20A. Additionally, the sliding resistance may cause the brush 30 to be excessively scraped off. Note that a small amount of hard compound particles 33 each of less than 1 μm or more than 6 μm in size may be contained.

Desirably, the hard compound particles 33 have a resistivity equal to or lower than the resistivity of carbon, in other words, equal to or lower than 16 μΩm. Electric contact resistance between the brush 30 and the commutator 20 significantly depends on the contact resistance of the graphite film 25 formed on the contact surface 20A of the commutator 20. The contact resistance of the graphite film 25 depends on the resistivity of carbon, which corresponds to a main component. Carbon has a resistivity of approximately 16 μΩm. Thus, as long as the resistivity of the hard compound particles 33 is equal to or lower than the resistivity of carbon, in other words, equal to or lower than 16 μΩm, even with the hard compound particles 33 scattered on the contact surface 20A, the contact resistance between the commutator 20 and the brush 30 is prevented from increasing.

With the brush 30 pressed against the commutator 20, the brush 30 and the commutator 20 rub against each other to cause the hard compound particles 33 contained in the brush 30 to be transferred to the contact surface 20A of the commutator 20. In other words, the hard compound particles 33 are harder than the other substances used for the commutator 20 and the brush 30, and the force by which the brush 30 is pressed against the commutator 20 and heat caused by friction act on the hard compound particles 33. Thus, the hard compound particles 33 are scattered on or near the contact surface 20A of the commutator 20 and implanted in the contact surface 20A.

The hard compound particles 33 are scattered on or near the contact surface 20A of the commutator 20, and thus hard portions including the hard compound particles 33 and non-hard portions different from the hard portions are present on the contact surface 20A of the commutator 20. The brush 30 pressed against the commutator 20 is supported by the hard compound particles 33, thus reducing the force by which the brush 30 is pressed against the non-hard portions (the portions different from the hard compound particles 33). This inhibits the brush 30 from strongly rubbing the non-hard portions, allowing suppression of scraping of the non-had portions, in other words, the base material of the commutator 20.

Figure 6:
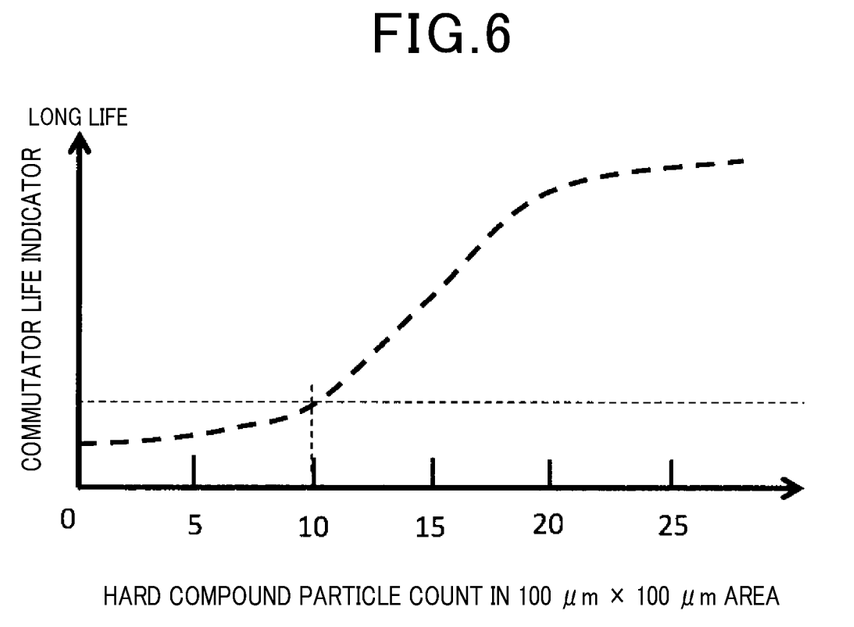
FIG. 6 is a diagram illustrating a relationship between the abundance rate of hard compound particles and the life of the commutator.
Figure 7:
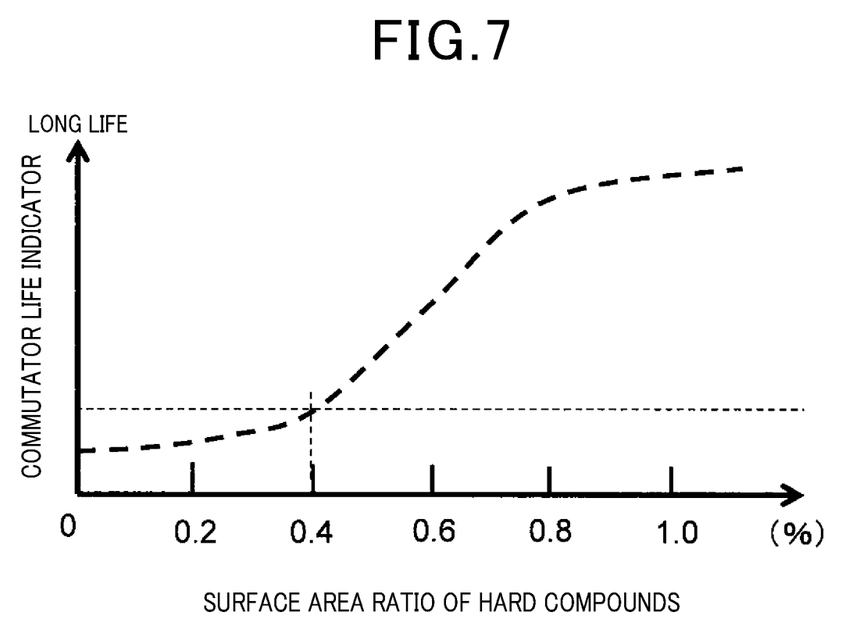
FIG. 7 is a diagram illustrating a relationship between the exposed area of the hard compound particles and the life of the commutator.

Now, a relationship between the rate of presence of the hard compound particles 33 and the degree of wear of the commutator 20 will be discussed based on FIG. 6 and FIG. 7. FIG. 6 is a diagram illustrating a relationship between the abundance ratio of the hard compound particles 33 and the life of the commutator 20. Note that "abundance rate" refers to the average number of hard compound particles 33 scattered in a predetermined area. FIG. 7 is a diagram illustrating a relationship between the ratio of exposed area of the hard compound particles 33 and the life of the commutator 20. Note that "exposed area" refers to the surface area of the portions of the hard compound particles 33 protruding from the contact surface 20A of the commutator 20.

The present inventor repeated experiments with the abundance ratio of the hard compound particles 33 in the contact surface 20A of the commutator 20 of the hard compound particles 33 to determine the appropriate abundance rate. As a result of the repeated experiments about the abundance rate, the present inventor discovered that 10 or more hard compound particles 33 present within a 100 μm×100 μm area of the contact surface 20A of the commutator 20 improve a wear reduction effect on the commutator 20 to extend the life of the commutator 20, in other words, the period of time until the commutator 20 reaches a wear limit, as illustrated in FIG. 6. The present inventor also found that more than 100 hard compound particles 33 present within the area of 100 μm×100 μm excessively enhance the action of scraping of the brush 30. Thus, in the present embodiment, 10 to 100 hard compound particles 33 are present within the area of 100 μm×100 μm of the contact surface 20A of the commutator 20. This allows suppression of scraping of the brush 30, while reducing wear of the commutator 20.

Note that, when the hard compound particles 33 are transferred from the brush 30, the hard compound particles 33 are likely to be transferred in a case where the hard compound particles 33 have a low abundance rate and to be lost instead of being transferred in a case where the hard compound particles 33 have a high abundance rate because the contact surface 20A of the commutator 20 includes many hard portions. Thus, the appropriate abundance rate is likely to be achieved during transfer from the brush 30.

Additionally, as a result of repeated experiments with the ratio of the exposed area of the hard compound particles 33 to the surface area of the contact surface 20A of the commutator 20 changed, the present inventor found that the exposed hard compound particles 33 accounting for 0.4% or more of the surface area of the contact surface 20A of the commutator 20 improve the wear reduction effect on the commutator 20 as illustrated in FIG. 7. Thus, in the present embodiment, the exposed hard compound particles 33 account for 0.4% or more of the surface area of the commutator 20. This enables a reduction in wear of the commutator 20. Note that, in a case where the hard compound particles 33 have an appropriate abundance rate and an appropriate size, the exposed area of the hard compound particles 33 is 0.4% or more of the surface area.

The ratio and amount of the hard compound particles 33 contained in the brush 30 to achieve the abundance ratio of the hard compound particles 33 and the exposed area of the hard compound particles 33 as described above will now be discussed. Not all the hard compound particles 33 in the brush 30 are transferred but some of the hard compound particles 33 are lost instead of being transferred. Thus, a surface of the brush 30 orthogonal to the direction in which the brush 30 is pressed against the commutator 20 needs to contain the hard compound particles 33 with a certain area ratio. On the other hand, undesirably, the hard compound particles 33 with an excessively high area ratio reduce the rate of graphite to hinder action of a lubrication function of the graphite. Thus, in the present embodiment, in the brush, an area ratio of the hard compound in a plane orthogonal to a direction in which the brush is pressed against the commutator is 0.4% to 5%. In a case where the area ratio of the area occupied by the hard compound particles 33 is 0.4% to 5%, lubricity can be retained, with the hard compound particles 33 appropriately transferred to the contact surface 20A of the commutator 20.

Additionally, an increased amount of the hard compound particles 33 contained in the brush 30, which includes a sintered compact, scrape the commutator 20 or reduce the amount of graphite contained in the sintered compact to hinder action of the lubrication function of the graphite. Thus, in the present embodiment, the amount of the hard compound particles 33 contained in the brush 30 is limited to 1 mass % or less to allow inhibition of scraping of the commutator 20 by the hard compound particles 33 and suppression of degradation of lubricity between the commutator 20 and the brush 30.

Note that the metal sulfide solid lubricant and the hard compound particles 33 are mixed with graphite and copper powder and that the mixture is molded. Thus, the metal sulfide solid lubricant and the hard compound particles 33 are contained in the brush 30 all over the area of the brush 30 in the direction in which the brush 30 is pressed against the commutator 20. In other words, the hard compound particles 33 are contained within a predetermined assumed wear range from the contact surface of the brush 30 with the commutator 20. This allows the hard compound particles 33 to be fed to the contact surface 20A of the commutator 20 until the assumed wear range of the brush 30 wears away and the brush 30 reaches the end of life. Note that the assumed wear range is, in the pressing direction, from a commutator 20-side end surface of the brush 30 to a position of the brush 30 from which the pigtail 35 protrudes.

As described above, an operation test was conducted in which the brush 30 containing the hard compound particles 33 in a predetermined ratio was used in the DC motor 40 to which a voltage of approximately 12 V is applied during cold starting and through which a current of 100 A or more may flow during operation. In the operation test, it was confirmed that, after several thousands of operations, the hard compound particles 33 are present on the contact surface 20A of the commutator 20 in an abundance rate of 10 to 100 hard compound particles 33 within the area of 100 μm×100 μm and that the exposed area of the hard compound particles 33 is 0.4% or more.

The hard compound particles 33 thus scattered on the contact surface 20A of the commutator 20 during use enable the commutator 20 to be suppressed from wearing, allowing improvement of life of the commutator 20. Additionally, suppression of wear of the commutator 20 allows inhibition of decrease in shape accuracy caused by uneven wear of the commutator 20, that is, degradation of roundness for a cylindrical commutator and degradation of flatness for a face commutator. Thus, sparking caused by reduced shape accuracy can be suppressed from occurring, allowing the life of the brush 30 to be extended.

Additionally, the hard compound particles 33 are scattered on the contact surface 20A of the commutator 20. This significantly inhibits the uneven shape of the uneven portion 22 of the commutator 20 from being worn out, enabling the stabilization effect for sliding contact of the brush 30 to be maintained for an extended period of time. A life improvement effect on the brush 30 can also be maintained for an extended period of time.

According to the present embodiment described above in detail, the following excellent effects are produced.

The hard compound particles 33 are contained in the brush 30. The hard compound particles 33 are scattered on or near the contact surface 20A of the commutator 20 with the brush 30 at least during use, and thus hard portions including the hard compound particles 33 and non-hard portions different from the hard portions are present on the contact surface 20A of the commutator 20. The hard portions can suppress the non-hard portions from wearing, in other words, the copper or copper alloy portions of the commutator 20. This enables the commutator 20 to be suppressed from wearing, allowing improvement of life of the commutator 20.

In a case where the hard compound particles 33 are contained in the brush 30, sliding between the brush 30 and the commutator 20 causes the hard compound particles 33 to be transferred to the commutator 20. As a result, the hard compound particles 33 are scattered on or near the contact surface 20A of the commutator 20. Additionally, as the brush 30 wears away, the hard compound particles 33 contained in the brush 30 continue to be transferred. Thus, even in a case where the hard compound particles 33 are lost from the contact surface 20A of the commutator 20, new hard compound particles 33 are fed to allow the hard compound particles 33 to be continuously scattered on or near the contact surface 20A of the commutator 20.

The hard compound particles 33 are contained in the brush 30 within the predetermined assumed wear range from the contact surface with the commutator 20. In other words, the hard compound particles 33 are contained within the range in which the brush 30 wears away. Thus, the hard compound particles 33 can be fed to the contact surface 20A of the commutator 20 until the assumed wear range of the brush 30 wears away and the brush reaches the end of life of the brush. The hard compound particles 33 can be kept scattered on or near the contact surface 20A of the commutator 20, allowing the commutator 20 to be suppressed from wearing.

Not all the hard compound particles 33 in the brush 30 are transferred, and some of the hard compound particles 33 are lost instead of being transferred. Thus, the hard compound particles 33 with a certain area ratio need to be contained. On the other hand, undesirably, the hard compound particles 33 with an excessively high area ratio reduce the ratio of the graphite, hindering the action of the lubrication function of the graphite. Thus, in the present embodiment, in a case where, for the surface of the brush 30 orthogonal to the direction in which the brush 30 is pressed against the commutator 20, the area ratio, to the surface, of the portion of the surface occupied by the hard compound particles 33 is 0.4% to 5%, lubricity can be retained with the hard compound particles 33 appropriately transferred to the contact surface 20A of the commutator 20.

An increased amount of the hard compound particles 33 contained in the sintered compact (brush 30) scrape the commutator 20 or reduce the amount of graphite contained in the sintered compact to hinder the action of the lubrication function of the graphite. Thus, the amount of the hard compound particles 33 contained in the brush 30 is limited to 1 mass % or less to allow inhibition of scraping of the commutator 20 by the hard compound particles 33 and suppression of degradation of lubricity between the commutator 20 and the brush 30.

Sliding between the commutator 20 and the brush 30 causes the graphite in the brush 30 to be transferred to the commutator 20, with the graphite film 25 formed on the contact surface 20A of the commutator 20. At this time, in a case where the metal sulfide solid lubricant is contained in the brush 30, the metal sulfide solid lubricant is also contained in the graphite film 25 formed on the contact surface 20A of the commutator 20. The graphite film 25 containing the metal sulfide solid lubricant provides excellent lubricity. Thus, in addition to suppression of wear due to the hard compound particles 33, the lubricity provided by the metal sulfide solid lubricant protects the contact surface 20A of the commutator 20.

The graphite film 25 generally has an average thickness of approximately 1 μm. Thus, excessively small hard compound particles 33 are buried in the graphite film 25. On the other hand, in a case where the hard compound particles 33 are excessively large in size, during sliding between the hard compound particles 33 and the brush 30, the hard compound particles 33 offer sliding resistance against the brush 30 and are likely to detach from the contact surface 20A of the commutator 20. Additionally, the sliding resistance causes the brush 30 to be excessively scraped off.

Thus, in the present embodiment, the hard compound particles 33 are each 1 to 6 μm in size. The hard compound particles 33 each of more than 1 μm in size are likely to be exposed from the graphite film 25. Additionally, the hard compound particles 33 each of less than 6 μm in size can be hindered from offering the sliding resistance. This allows the brush 30 and the commutator 20 to be appropriately supported, enabling reduction in wear of the commutator 20.

Electric contact resistance between the brush 30 and the commutator 20 significantly depends on contact resistance of the graphite film 25 formed on the contact surface 20A of the commutator 20. The contact resistance of the graphite film 25 depends on the resistivity of carbon, corresponding to a main component, and carbon has a resistivity of approximately 16 μΩm. Thus, in a case where the resistivity of the hard compound particles 33 is equal to or lower than the resistivity of carbon, in other words, equal to or lower than 16 μΩm, the contact resistance between the brush 30 and the commutator 20 is prevented from increasing in spite of the scattered hard compound particles 33. Using the hard compound particles 33 with a resistivity of 16 μΩm or less allows the commutator 20 to be suppressed from wearing, while inhibiting increase in resistance of the DC motor 40.

In the related art, the uneven shape parallel to the direction of sliding over the brush 30 is provided on the outer peripheral surface of the commutator 20 to stabilize the sliding contact state of the brush 30. In this case, the hard compound particles 33 are scattered on or near the contact surface 20A of the commutator 20 to suppress the commutator 20 from wearing and to retain the uneven shape of the outer peripheral surface of the commutator 20. This allows sliding contact with the brush 30 to be kept stabilized for an extended period of time.

Other Embodiments

The present disclosure is not limited to the above-described embodiments and may be, for example, implemented as follows. The following alternative configurations may be separately applied to the configurations of the above-described embodiments or may be optionally combined for application.

Figure 8:
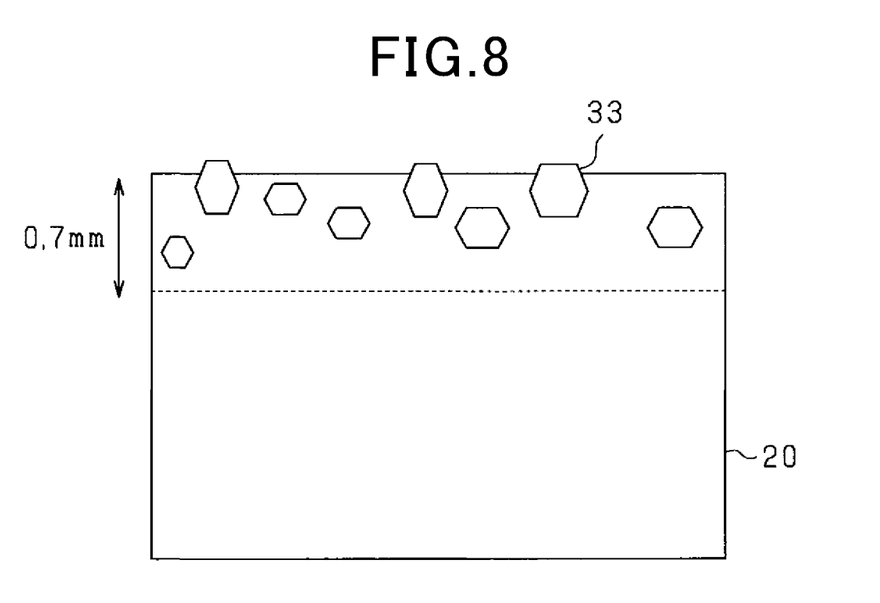
FIG. 8 is a schematic diagram of a commutator according to another embodiment.

The hard compound particles 33 may be scattered on or near the contact surface 20A of the commutator 20 with the brush 30 as illustrated in FIG. 8. In this case, the hard compound particles 33 are buried in advance within a predetermined range including the surface of the commutator 20 (contact surface 20A with the brush 30) or the vicinity of the surface. Then, the commutator 20 is formed into a perfect circle by polishing, and the uneven portion 22 is subsequently formed. Note that the range within which the hard compound particles 33 are scattered may be from the surface of the commutator 20 to the wear limit of the commutator 20, for example, less than 0.7 mm from the surface.

Figure 9:
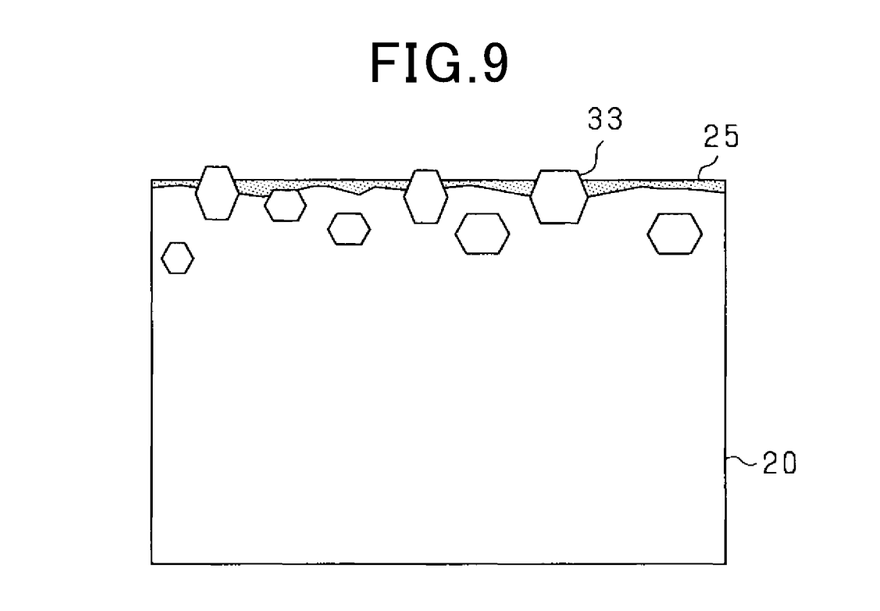
FIG. 9 is a schematic diagram of the commutator during use according to the other embodiment.

During use, the non-hard portions of the commutator 20 slightly wear away, and the graphite film 25 is formed on the contact surface 20A as illustrated in FIG. 9. Then, the hard compound particles 33 exposed from the contact surface 20A of the commutator 20 provide support between the commutator 20 and the brush 30. Note that, even in a case where the commutator 20 wears away, the hard compound particles 33 buried to the wear limit continue to provide support between the commutator 20 and the brush 30 allowing the commutator 20 to be suppressed from wearing.

In the commutator 20, the hard compound particles 33 have been scattered on or near the contact surface 20A of the commutator 20 from before use, and thus wear of the commutator 20 can be reduced from the beginning of use. Additionally, the hard compound particles 33 are scattered in the commutator 20 in advance instead of being transferred from the brush 30, facilitating the control of a ratio for scattering of the hard compound particles 33 and the like. Note that the same hard compound particles 33 as those buried in the commutator 20 are desirably contained in the brush 30. In this case, even in a case where the hard compound particles 33 buried in advance are lost, new hard compound particles 33 can be fed by being transferred from the brush 30.

Additionally, the abundance ratio of the hard compound particles 33 buried in advance may be such that 10 to 100 hard compound particles 33 are present within the area of 100 μm×100 μm on average. As described above in the embodiments, in the configuration in which 10 to 100 hard compound particles 33 are present within the area of 100 μm×100 μm of the contact surface 20A of the commutator 20, the brush 30 can be inhibited from being scraped off, with wear of the commutator 20 reduced.

The ratio, to the surface area of the commutator 20, of the exposed area of the hard compound particles 33 buried in advance may be 0.4% or more. As described above in the embodiments, in the configuration in which the exposed hard compound particles 33 account for 0.4% or more of the surface area of the commutator 20, wear of the commutator 20 can be reduced.

In the direction in which the brush 30 is pressed against the commutator 20, the commutator 20-side end of the brush 30 may have a higher content of the hard compound particles 33 than the opposite end of the brush 30. In this configuration, the portion of the brush 30 that has a high content of the hard compound particles 33 comes into sliding contact with the contact surface 20A of the commutator 20 with a small amount of the hard compound particles 33, and thus the hard compound particles 33 are more likely to be transferred. Additionally, in a case where the hard compound particles 33 are scattered on the contact surface 20A of the commutator 20, a small amount of the hard compound particles 33 and a large amount of graphite are contained in the brush 30. Thus, after transfer of the needed hard compound particles 33, lubricity can be improved.

What is claimed is:

1. A DC motor comprising:
a commutator formed of copper or a copper alloy of 99% or more copper; and
a brush pressed against and in contact with the commutator, wherein
the brush is composed of a sintered compact including graphite and copper powder,
hard compound particles higher in hardness than any of the copper or the copper alloy and the graphite or the copper powder are contained in at least one of the commutator and the brush and are scattered on or near a contact surface of the commutator with the brush at least during use.

2. The DC motor according to claim 1, wherein
the hard compound particles are contained in the brush.

3. The DC motor according to claim 2, wherein
the hard compound particles are contained in the brush within a predetermined assumed wear range from the contact surface with the commutator.

4. The DC motor according to claim 2, wherein
in the brush, an area ratio of the hard compound particles in a plane orthogonal to a direction in which the brush is pressed against the commutator is 0.4% to 5%.

5. The DC motor according to claim 2, wherein
in the brush, an amount of the hard compound particles contained in the sintered compact is 1 mass % or less.

6. The DC motor according to claim 1, wherein
a metal sulfide solid lubricant is contained in the brush.

7. The DC motor according to claim 1, wherein
the hard compound particles are scattered on or near the contact surface of the commutator and the brush.

8. The DC motor according to claim 7, wherein
an abundance ratio of the hard compound particles present on or near the contact surface of the commutator is a ratio at which an average of 10 to 100 hard compound particles are present within an area of 100 μm×100 μm of the contact surface of the commutator and the brush.

9. The DC motor according to claim 7, wherein
a ratio, to a surface area of the commutator, of an exposed area of the hard compound particles exposed from the contact surface of the commutator is 0.4% or more.

10. The DC motor according to claim 1, wherein
the hard compound particles are each 1 to 6 μm in size.

11. The DC motor according to claim 1, wherein
the hard compound particles have a resistivity of 16 μΩm or less.

12. The DC motor according to claim 1, wherein
an outer peripheral surface of the commutator has an uneven shape parallel to a direction of sliding over the brush.

* * * * *